United States Patent
Harder et al.

(10) Patent No.: US 7,556,155 B2
(45) Date of Patent: Jul. 7, 2009

(54) FLUID FILTER AND METHODS

(75) Inventors: David B. Harder, Burnsville, MN (US); Philip Edward Johnson, Apple Valley, MN (US); Eivind Stenersen, River Falls, WI (US); Curt A. Rausch, Bloomington, MN (US); John R. Hacker, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 263 days.

(21) Appl. No.: 10/530,642

(22) PCT Filed: Oct. 7, 2003

(86) PCT No.: PCT/US03/31867

§ 371 (c)(1),
(2), (4) Date: Dec. 5, 2005

(87) PCT Pub. No.: WO2004/033067

PCT Pub. Date: Apr. 22, 2004

(65) Prior Publication Data

US 2006/0157403 A1    Jul. 20, 2006

Related U.S. Application Data

(60) Provisional application No. 60/417,285, filed on Oct. 8, 2002.

(51) Int. Cl.
*B01D 27/08* (2006.01)
*B01D 35/30* (2006.01)
*B01D 27/00* (2006.01)

(52) U.S. Cl. .................. 210/445; 210/440; 210/443; 210/451; 210/455

(58) Field of Classification Search .................. None
See application file for complete search history.

(56) References Cited

U.S. PATENT DOCUMENTS

| 2,902,162 | A |   | 9/1959 | Humbert |
|---|---|---|---|---|
| 3,232,437 | A |   | 2/1966 | Hultgren |
| 3,397,789 | A |   | 8/1968 | Hultgren |
| 4,369,113 | A | * | 1/1983 | Stifelman .................. 210/440 |
| 4,853,118 | A |   | 8/1989 | Brownell et al. |
| 5,104,537 | A |   | 4/1992 | Stifelman et al. |
| 5,490,930 | A |   | 2/1996 | Krull |
| 5,653,870 | A | * | 8/1997 | Tsuchiya et al. ............ 210/232 |

(Continued)

FOREIGN PATENT DOCUMENTS

DE    1 152 285    8/1963

(Continued)

*Primary Examiner*—Krishnan S Menon
*Assistant Examiner*—Madeline Gonzalez
(74) *Attorney, Agent, or Firm*—Merchant & Gould P.C.

(57) ABSTRACT

A fluid filter arrangement has a housing, a filter cartridge oriented within the housing, and a projection arrangement. The projection arrangement is oriented to space the filter cartridge from a wall of the housing in order to provide a fluid flow path between the filter cartridge and the housing wall. In some arrangements, the projection arrangement is part of an end cap. Embodiments of the projections include axial extensions, radial extensions, and angled extensions including both radial and axial components. Systems of use, methods of filtering, methods of making, and methods of servicing include arrangements of these types.

5 Claims, 16 Drawing Sheets

U.S. PATENT DOCUMENTS

| | | | |
|---|---|---|---|
| 5,779,903 A * | 7/1998 | Smith et al. | 210/440 |
| 5,833,843 A * | 11/1998 | Covington | 210/130 |
| 5,904,357 A | 5/1999 | Demirdogen et al. | |
| 5,906,736 A | 5/1999 | Bounnakom et al. | |
| 5,996,810 A | 12/1999 | Bounnakhom et al. | |
| 6,045,693 A | 4/2000 | Miller et al. | |
| 6,146,527 A * | 11/2000 | Oelschlaegel | 210/232 |
| 6,893,560 B2 * | 5/2005 | Reinhart | 210/232 |
| 7,232,035 B1 * | 6/2007 | Crawford et al. | 210/456 |
| 2002/0074281 A1 | 6/2002 | Steger, Jr. et al. | |

FOREIGN PATENT DOCUMENTS

| | | |
|---|---|---|
| GB | 2 356 825 | 6/2001 |
| JP | 5-96107 | 4/1993 |
| WO | 95/09037 | 4/1995 |
| WO | 97/37743 | 10/1997 |

* cited by examiner

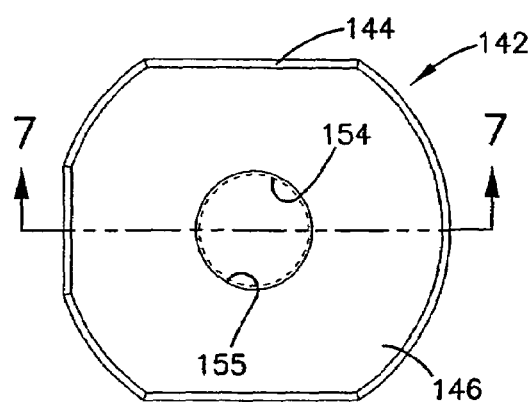
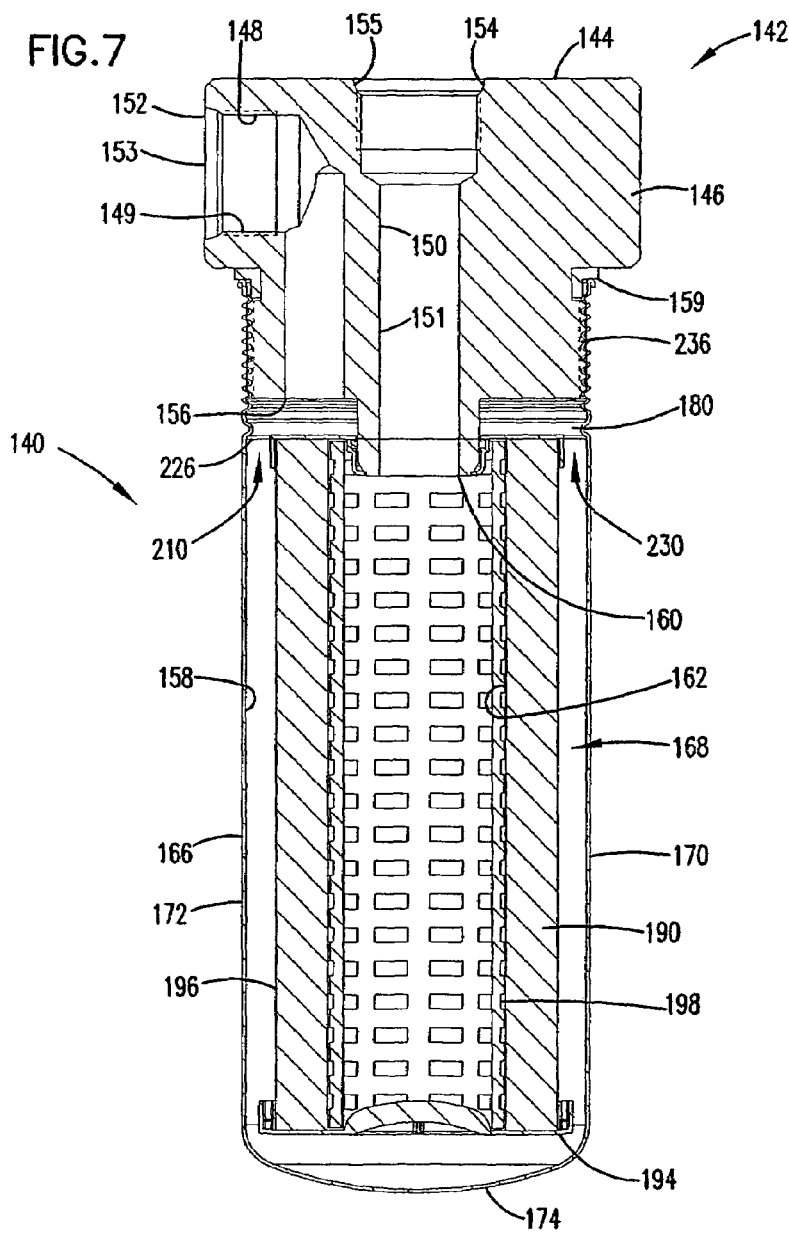

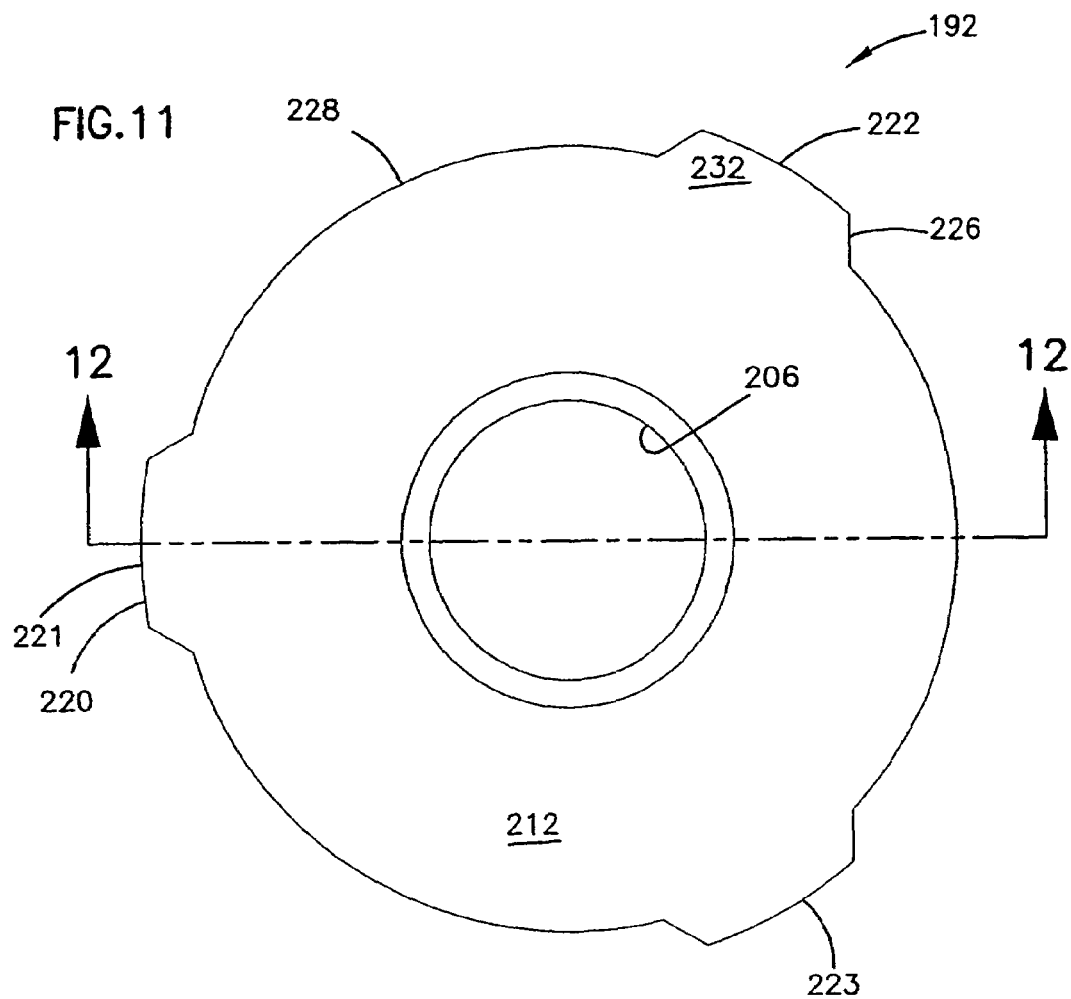
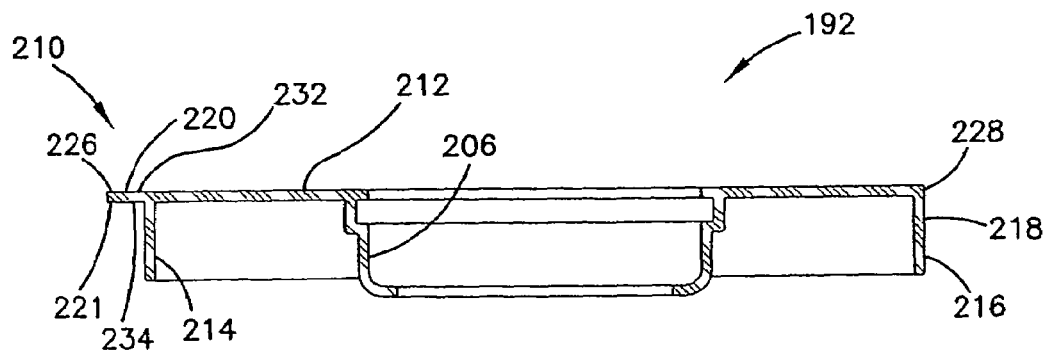

FIG.15
FIG.16
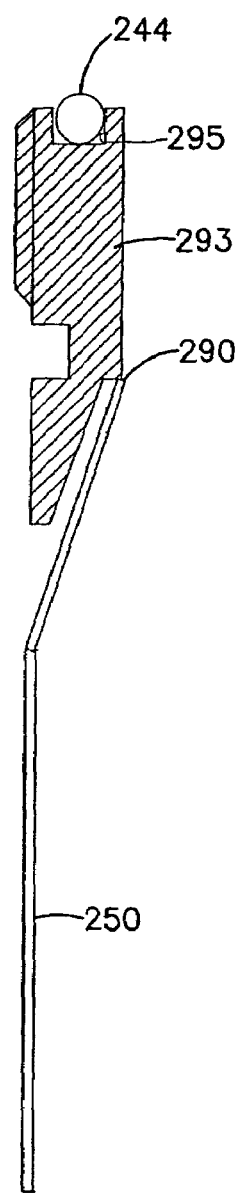
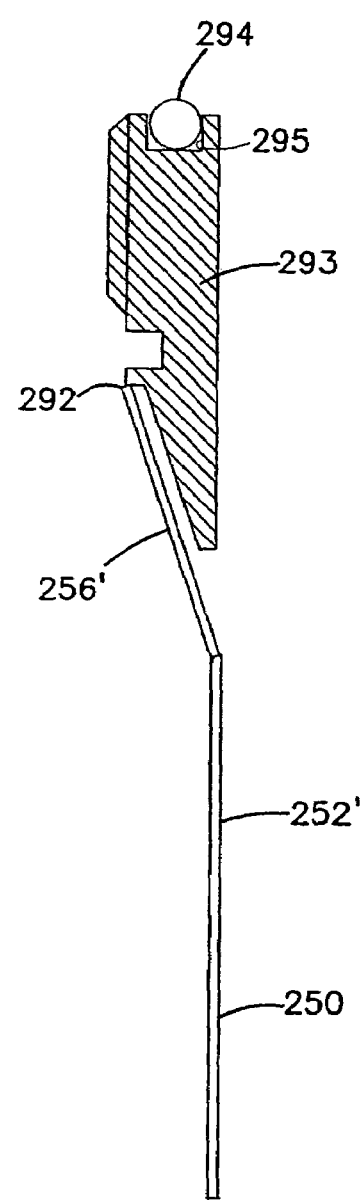

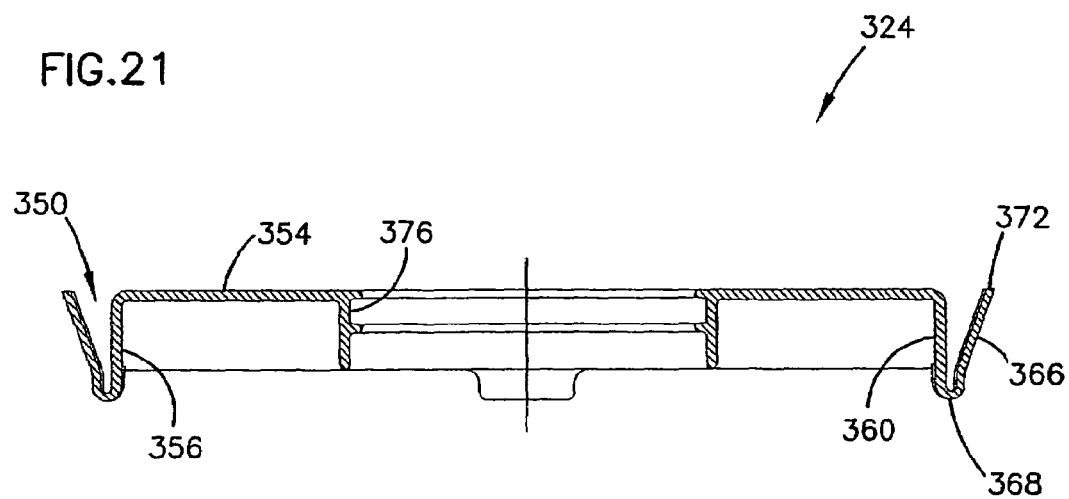
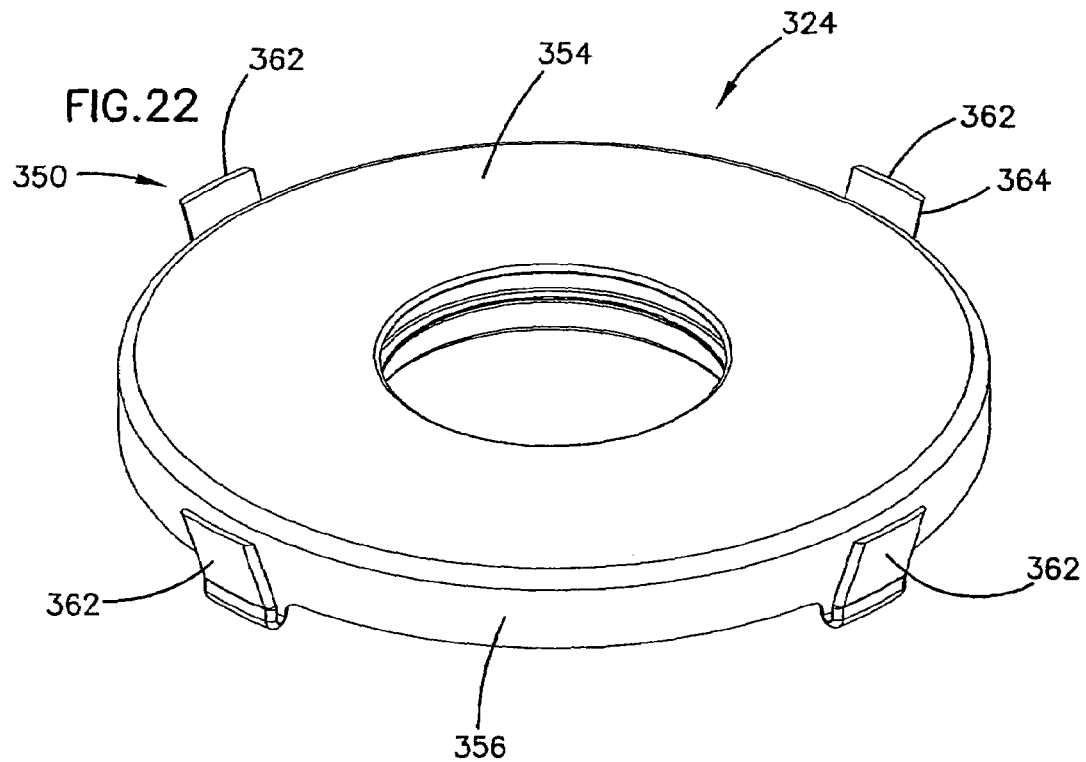

FLUID FILTER AND METHODS

This application is being filed as a National Stage Application based on PCT International Patent Application Number WO 2004/033067 in the name of Donaldson Company, Inc., a U.S. national corporation and resident, (Applicant for all countries except U.S.); David B. Harder, a U.S. citizen and resident (Applicant for U.S. only); Philip Edward Johnson, a GB citizen and U.S. resident (Applicant for U.S. only); Eivind Stenersen, a NO citizen and U.S. resident (Applicant for U.S. only); and Curt A. Rausch, a U.S. citizen and resident (Applicant for U.S. only) on 07 Oct. 2003, designating all countries and claiming priority to U.S. Ser. No. 60/417,285 filed on 08 Oct. 2002.

TECHNICAL FIELD

This disclosure relates to fluid filtration, filter elements, cartridges, systems, and methods of assembly and use. In particular, this disclosure concerns filters, filter cartridges, and methods for purifying fluids for uses-in connection with, for example, engines or industrial purposes. Such applications may include lubrication filters, hydraulic filters, fuel filters, and spin-on filters for gases.

BACKGROUND

Filtration is needed in order to purify fluids to protect equipment. Filtration is used in, for example, internal combustion engine systems, hydraulic systems, compressors, generators, and others. In typical systems, the filtration is accomplished by using a filter device having some sort of filtration media. After a period of use, the filter media becomes clogged and the restriction across the media rises to an unacceptable level. At that time, the filter device needs to be serviced. In some systems, the entire filter device is disposed of and replaced with a new filter device. In some systems, only certain internal components of the filter device are replaced. Still in other systems, the filter media is merely cleaned out.

One type of filter is a "spin-on filter." Spin-on filters are disposable units, which typically include a single-use housing holding a permanently mounted, non-replaceable filter element (or filter cartridge). The canister holding the filter cartridge is usually spun onto a filter head by threaded engagement. The liquid to be cleaned passes from the filter head and into the housing for filtering. The cleaned liquid exits the housing the re-enters the filter head. After some period of use, the spin-on canister filter is removed from the filter head and is discarded. A new spin-on canister filter is then mounted onto the filter head.

Ways to reduce the manufacturing cost and the convenience and ease of use continue to be desirable. Improvements in other areas for filtration devices, methods of assembly, and methods of use also are desirable.

SUMMARY

A fluid filter arrangement is disclosed having a housing, a filter cartridge oriented within the housing, and a projection arrangement. The projection arrangement is oriented to space the filter cartridge from a wall of the housing in order to define a fluid flow path between the filter cartridge and the housing wall.

In some embodiments, the projection arrangement is constructed to be part of an end cap oriented on a portion of the filter cartridge. In some embodiments, these parts are reversed. In some embodiments, the projection arrangement is on a plate that is a separate piece from the end cap. In some embodiments, the projection arrangement extends in an axial direction from the filter cartridge toward an open mouth of the housing. In other embodiments, the projection arrangement extends in a radial direction from the filter cartridge toward the wall of the housing. Other embodiments include variations in-between with the projection arrangement being at an angle including both radial and axial components.

Fluid filter arrangements as described herein can be part of a filter assembly. Such filter assemblies may typically include a filter head having a fluid flow inlet port and a fluid flow outlet port. The filter arrangement will be releasably securable to the filter head in order to remove at least some of the contaninants in the fluid flowing through the inlet port. The filter system can be part of an engine, a hydraulic system, a generator, a compressor, and others.

A filter cartridge is provided that can be used as part of filter arrangements as described herein. Typical filter cartridges may include a region of filter media and a projection arrangement extending from a portion of the filter cartridge. The projection arrangement can be either an integral part of the cartridge or a separate piece that engages the cartridge.

Methods of constructing or assembling a filter and methods of filtering are described and utilize the types of constructions described herein. In one embodiment, a housing is provided, a filter cartridge is inserted into the housing, and projections are engaged between the housing and the filter cartridge to secure the filter cartridge in the housing.

BRIEF DESCRIPTION OF THE DRAWINGS

FIG. 6 is an end view of a filter assembly including a filter head and a filter constructed according to principles of this disclosure;

FIG. 7 is a cross-sectional view taken along the line 7-7 of FIG. 6 showing the filter head and another embodiment of a filter constructed according to principles of this disclosure;

FIG. 11 is an end view of the end cover utilized with the filter cartridge of FIGS. 9 and 10;

FIG. 12 is a cross-sectional view of the end cover depicted in FIG. 11, the cross-section being taken along the line 12-12;

FIG. 15 is a schematic, fragmented, cross-sectional view showing a portion of a filter arrangement constructed in accordance with another embodiment;

FIG. 16 is a schematic, fragmented, cross-sectional view showing a portion of a filter arrangement constructed in accordance with another embodiment;

FIG. 21 is a schematic, cross-sectional view of a portion of the embodiment depicted in FIGS. 17-19; and FIG. 22 is a perspective view of the portion of the embodiment depicted in FIG. 21.

DETAILED DESCRIPTION

Figure 1:
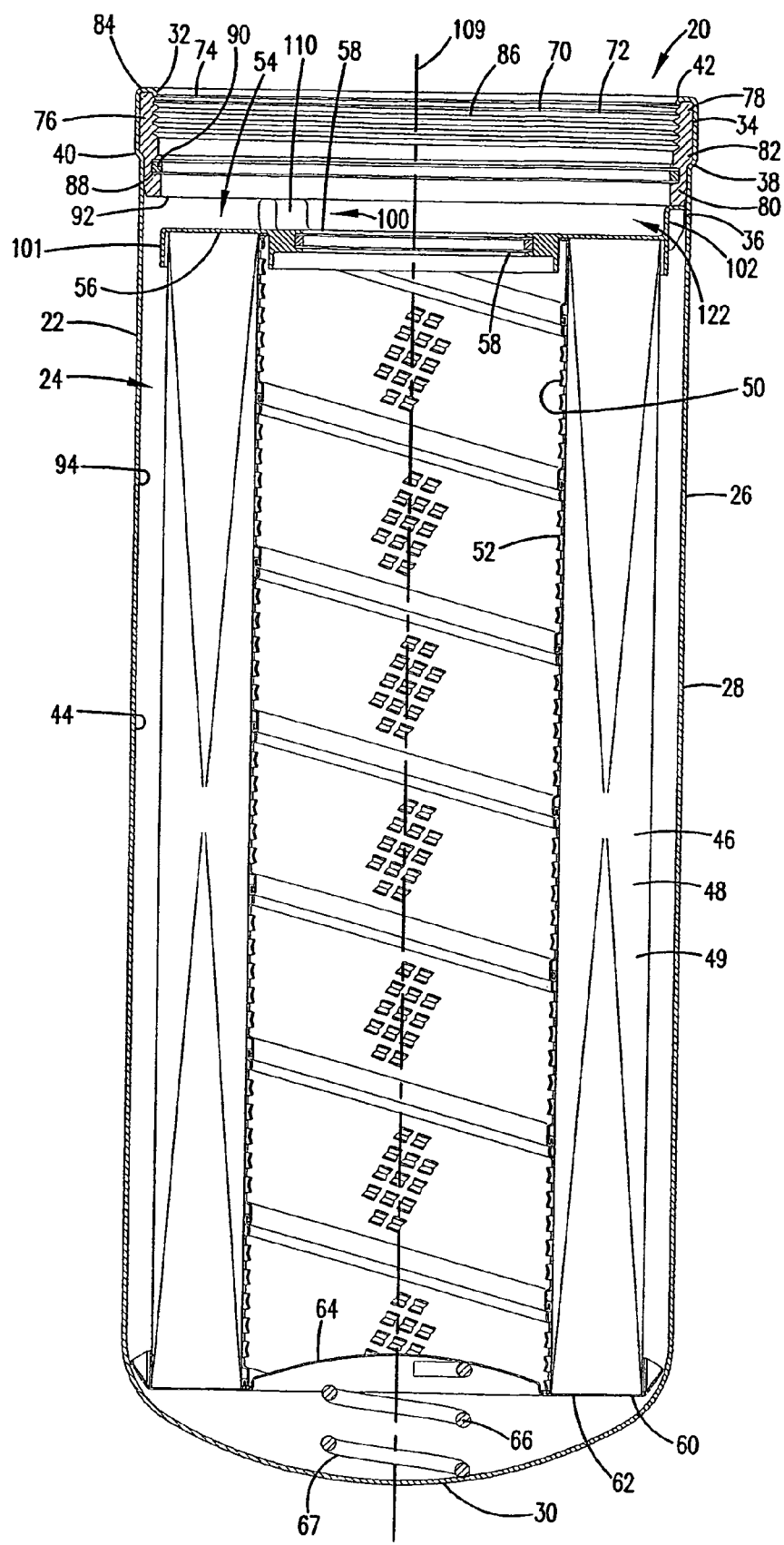
FIG. 1 is a schematic, cross-sectional view of one embodiment of a filter including a housing and a filter cartridge constructed according to principles of this disclosure.
Figure 2:
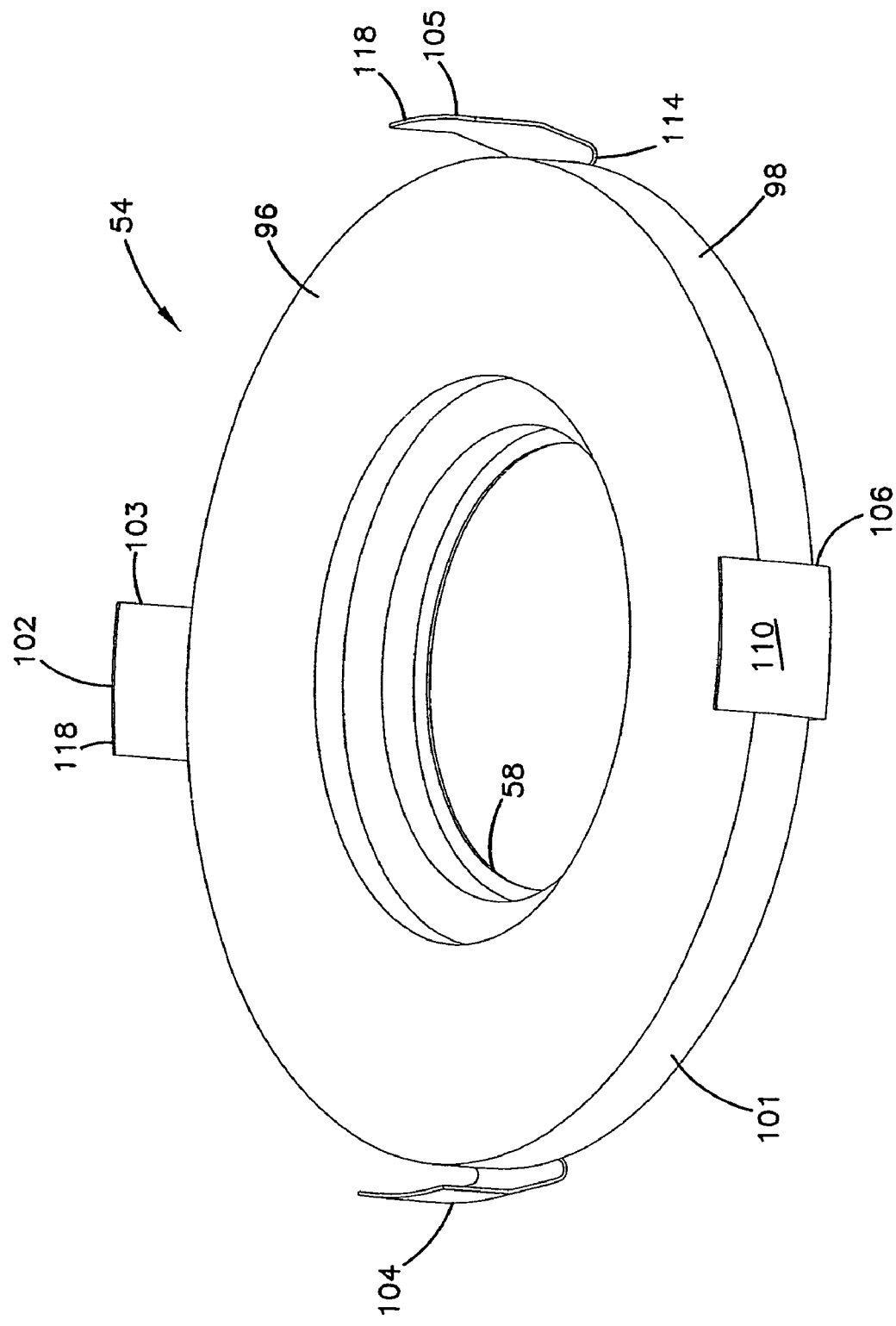
FIG. 2 is a perspective view of one embodiment of an end cover having a projection arrangement utilized in the filter depicted in FIG. 1.
Figure 3:
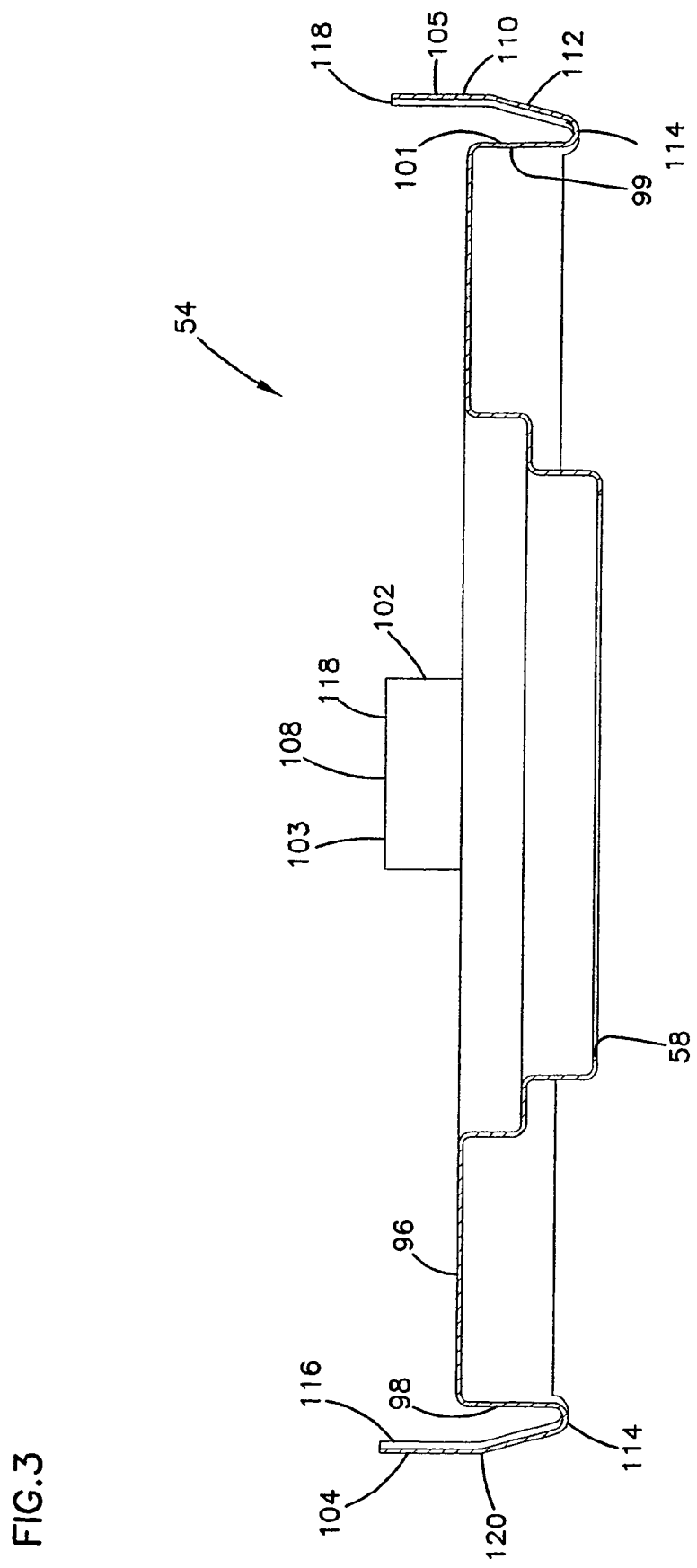
FIG. 3 is a cross-sectional view of the end cover depicted in FIG. 2.

A first embodiment of a fluid filter arrangement is depicted in FIGS. 1-3 generally at 20. By the term "filter arrangement" or "filter", it is meant, generally, an arrangement including a housing and a "filter cartridge" or "filter element" therein. The filter cartridge can either be removable and replaceable from the housing or permanently mounted within the housing. By "permanently mounted", it is meant that the cartridge or element cannot be removed and replaced from the housing without damaging either the housing or the filter element. The filter arrangement 20, in the example depicted, is removable and replaceable from a filter head, one example of which is depicted in FIG. 7 and described further below.

In the embodiment shown, the filter arrangement 20 includes a housing 22 and a filter cartridge 24 oriented therewithin. In the embodiment shown, the filter housing 22 is embodied in the form of a can 26 having a surrounding wall 28. The can 26 defines a closed end 30 and an open mouth or end 32. The can 26 can be many different shapes. For the purposes of illustration here, the can 26 is cylindrical having a circular cross-section. In the particular embodiment shown in FIG. 1, the surrounding wall 28 adjacent to the surrounding wall 32 defines at least two regions of differing diameters. In particular, there is a first region 34 and a second region 36. The first region 34, which is the region immediately adjacent to the open end 32 in the embodiment shown, has a larger diameter than the second region 36. Between the first region 34 and the second region 36 there is a step 38. Preferably, the step 38 forms a continuous, circumferential shoulder 40 that is useable to support and hold other structure, as described below. Terminating the wall 28 at the open end 32, in the embodiment shown in FIG. 1, is a U-shaped hook 42 that is used to help secure or hold other filter structure, as will be described further below.

The element or cartridge 24 is shown operably oriented within an interior 44 of the housing 22. The cartridge 24 includes, in this embodiment, a tubular region of filter media 46. The filter media may be many different types of media including, for example, pleated media 48. The pleated media 48 includes a plurality of pleats 49 and in extension generally between the closed end 30 and the open end 32 and arranged in a tubular orientation to define an open filter interior 50. Types of pleated media 48 that can be used include paper, cellulose, synthetic media, and combinations thereof. In some applications, the media 46 can be treated with fine fiber, sized on the order of micron or sub-micron (fiber diameter).

In the embodiment shown, the tubular region of media 46 is supported by an inner support tube or inner liner 52. The inner liner 52 is circumscribed and surrounded by the media 46. The inner liner 52 may be constructed from expanded metal, perforated metal, or other materials (including non-metallic) allowing for permeability and fluid flow therethrough. In some embodiments, there may also be an additional support tube in the form of an outer liner that is positioned to circumscribe and surround the media 46.

In the embodiment shown, the filter cartridge 24 includes at least one end cap or end cover 54. In the embodiment shown, the end cover 54 is secured to first end 56 of the filter media 46. The end cover 54, in the embodiment shown, defines a hole or aperture 58 that is in fluid communication with the open filter interior 50. Further details regarding certain preferred end covers 54 are described further below.

In the embodiment shown, there is also a second cap or end cover 60 that is secured to a second end 62 of the filter media 46. The second end cover 60, in the embodiment shown, is closed and defines no openings. In particular, the second end cover 60 is secured to the second end 62 of the filter media and covers or closes the open filter interior 50 through a section 64. In the embodiment shown, the section 64 is dome shaped and extends into the open filter interior 50 to be circumscribed or surrounded by the filter media 46. The section 64 also engages a biasing mechanism 66, such as spring 67, oriented between the internal portion of the closed end 30 and the section 64. The spring 67 helps to keep the filter cartridge 24 in place within the housing 22.

The filter arrangement 20 also includes a mechanism 70 for securing the filter arrangement 20 to a filter head. In the embodiment shown, the mechanism 70 is in the form of a plate 72, in particular, a threaded plate 74. Thread plate 74 has the general cross-section shape of the housing 22. In the example shown, the thread plate 74 is cylindrical defining a circular cross-section. The thread plate 74 forms a ring 76 having at least first and second regions 78, 80 of differing diameters. The first region 78 has a diameter larger than the second region 80. Between the first region 78 and the second region 80 is a stepped portion 82. As can be seen in FIG. 1, the stepped portion 82 engages and is supported by the shoulder 40 of the housing 22. The first region 78 is aligned with and against the first region 34 of the wall 28, while the second region 80 is aligned with and against the second region 36 of the wall 28. The hook 42 of the wall 28 overlaps, holds, and engages the end tip 84 of the thread plate 74.

It should be appreciated by reviewing FIG. 1 that through the interaction and engagement between the hook 42, end tip 84, stepped portion 82, and shoulder 40, the thread plate 74 is secured to the can 26 through mechanical engagement.

The plate 72, when secured in a permanent way to the can 26, as in the manner shown in FIG. 1, is considered to be part of the housing 22. Lining the internal portion of the first region 78 of the thread plate 74 are a series of threads 86. Through the threads 86, there can be threaded-engagement with mating threads on a filter head in order to mount and remove, selectively, the filter arrangement 20 from the filter head. As can be seen in FIG. 1, the threads 86, in the particular embodiment shown, are only along the first region 78 of the thread plate 74. In the second region 80 of the thread plate 74, there is defined a groove 88. The groove 88, in the embodiment shown, supports and holds a seal member 90 for forming a seal with the filter head when operably mounted thereon.

The thread plate 74 defines an end rim 92 that is on an opposite end of the end tip 84. As such, the rim 92 is positioned more closely to the filter cartridge 24 than the end tip 84.

The filter arrangement 20 includes a projection arrangement 100 that is constructed and arranged to space the filter cartridge 24 from the housing 22 in order to define a fluid flow path between the filter-cartridge 24 and the housing wall 28. This can be seen, for example, by a review of FIG. 1. Fluid to be cleaned is directed into the filter arrangement 20. The fluid flows, in a forward-flow arrangement, into the volume 94 between the cartridge 24 and the wall 28. The projection arrangement 100 spaces the cartridge 24 from the housing 22 (the housing 22, in this embodiment, including the thread plate 74) to allow a fluid path for the fluid to flow in order to get to the volume 94 outside of the region of filter media 46. The fluid then flows through the filter media 46, which removes at least some of the contaminants therein. The cleaned fluid flows through the inner liner 52 and into the open filter interior 50. From there, the clean fluid flows through the aperture 58 and then exits the filter arrangement 20. The filter arrangement 20 is also operable in a reverse-flow manner. In reverse-flow, the fluid to be cleaned is directed into the open filter interior 50, through the filter media 46, into the volume 94, and then out of the housing 22.

The projection arrangement 100 includes at least one projection 102 extending between the filter cartridge 24 and the housing 22. The projection can extend axially, radially, or a combination thereof (having both an axial component and a radial component). The projection 102 can be on a variety of structures. In other embodiments, the projection 102 can be mounted on the housing. In other embodiments, the projection 102 can be mounted on the cartridge. On other embodiments, the projection 102 can be mounted on other structure (see FIG. 20).

In the particular embodiment shown in FIG. 1, the projection arrangement 100 is part of the end cover 54. The end cover 54 includes a base 96 and a side wall 98 (FIGS. 2 and 3). The base 96 is generally orthogonal to the first end 56 of the filter media 46. The side wall 98 is generally parallel to the direction of the filter media 46 and parallel to the wall 28 of the can 26. The side wall 98, in the embodiment shown, generally circumscribes the base 96. The aperture 58 is circumscribed by both the base 96 and the side wall 98. The base 96 extends between the aperture 58 and the side wall 98.

In the embodiment shown, the end cover 54 includes a media-containing portion 99 (FIG. 3). The media-containing portion is embodied in the form of, in the example shown in FIGS. 1-3, the side wall 98. The media-containing portion 99 forms a continuous wall 101 around the filter media 46.

Still in reference to FIGS. 2 and 3, the projection arrangement-includes at least one and, in the embodiment shown, more than one projection 102 extending from at least one of the base 96 and the side wall 98. In the embodiment shown in FIGS. 2 and 3, there are four projections 103, 104, 105, 106 equally spaced from each other and extending from the side wall 98. In the embodiment shown, each of the projections 103, 106 extends in an axial direction from the side wall 98. By "axial", it is meant that the projections 103-106 define, generally, a longitudinal axis 108 (FIG. 3) that includes at least a portion that is substantially parallel to a central, longitudinal axis 109 (FIG. 1) of the filter arrangement 20.

In the embodiment shown in FIGS. 2 and 3, each of the projections 103-106 is in the form of tangs or tabs 110 extending from the end cap 54. In the example shown in FIG. 3, the tabs 110 include a base section 112 joined at a bight 114 to the wall 98. Extending from the base section 112 is a second section 116 defining a free end 118. In the embodiment shown, there is a bend or angle 120 between the base section 112 and the second section 116. It can be appreciated that each of the tabs 110 can be seen as being cantilevered from the end cover 54. It can also be seen that, in the embodiment shown, the tabs 110 have a length that is greater than the length of the side wall 98 and the free end 118 extends a distance beyond (in FIG. 3 above) the base 96.

As described above, the tabs 110 can be oriented with respect to the end cover 54 and the housing 22 in a variety of configurations. Again in reference to FIG. 3, in the particular example illustrated, the tabs 110 are configured to be in extension from the media-containing portion 99 of the end cover 54. For example, in FIG. 3, the tabs 110 extend from the bight 114 of the wall 98.

When the cartridge 24 is operably oriented within the interior 44 of the housing 22, the tabs 110 engage the thread plate 24 of the housing 22 (in particular, in FIG. 1), in order to allow fluid flow between the filter cartridge 24 and the housing wall 28. In reference again to FIG. 1, it can be seen how the free ends 118 of each of the tabs 1 10 engages the rim 92 in order to space the cartridge 24 from the thread plate 74 and define volume 122.

To construct the filter arrangement 20 shown in FIGS. 1-3, generally a can 26 is provided. At this point, the can 26 does not include a mechanism 70 attached thereto. The filter cartridge 24 is provided and is inserted through the open mouth 32 of the can 26. The filter cartridge is biased against the spring 67, and the thread plate 74 is oriented within the open mouth 32. The thread plate 74 is pressed against the filter cartridge 24 by engagement between the free end 118 of the tabs 110 and the bottom rim 92 of the thread plate 74. The thread plate 74 is secured to the can 26 by mechanical engagement and press fitting therebetween. In the illustrated embodiment, the filter cartridge is held in place within the housing 22 by biased engagement of the spring 67 against the thread plate 74. In other embodiments, there may not be a spring used.

Figure 4:
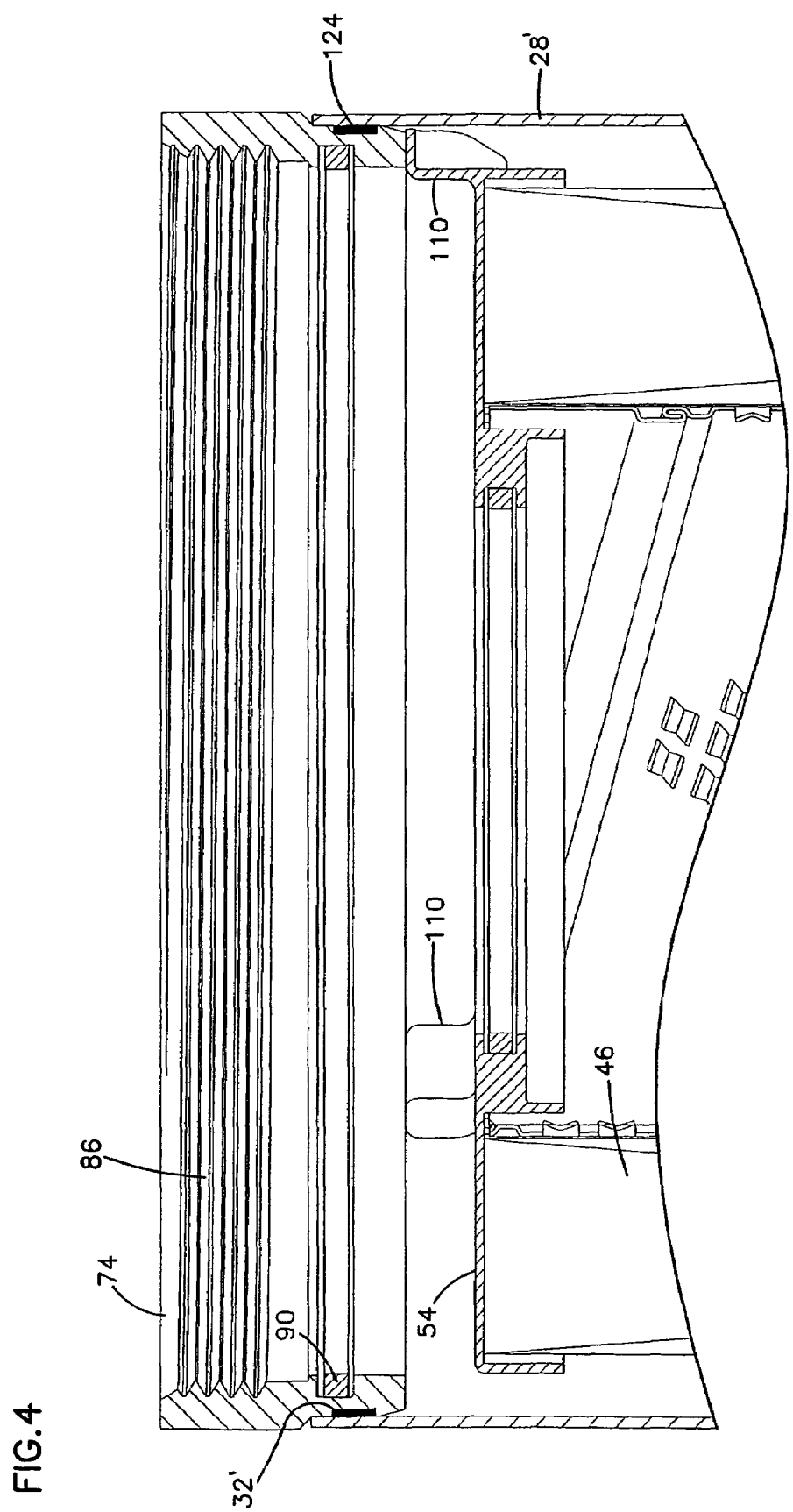
FIG. 4 is a fragmented, cross-sectional view of a portion of a filter, similar to that shown in FIG. 1 and depicting another embodiment.

An alternate embodiment of the housing 22 is shown in FIG. 4. In this embodiment, the thread plate 74 is secured to the housing wall 28' by way of fusion bonding such as a weld connection 124. As can be seen in FIG. 4, when connecting the thread plate 74 and the wall 28' in this fashion, the wall 28' does not have different areas of diameter adjacent to the open end 32'.

Figure 5:
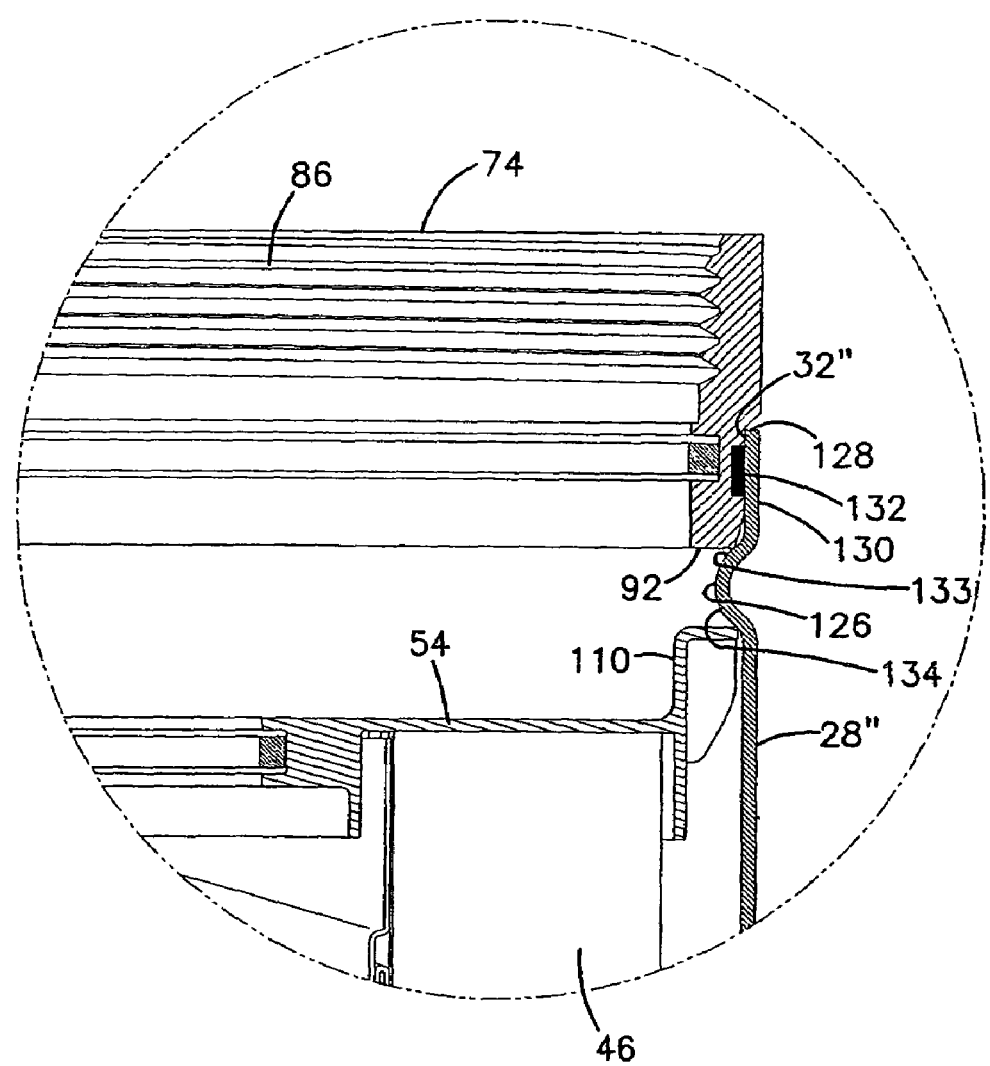
FIG. 5 is a fragmented, cross-sectional view showing a portion of another embodiment of a filter constructed according to principles of this disclosure.

Another embodiment of the housing 22 is shown in FIG. 5. In this embodiment, the housing wall 28" includes an inwardly extending projection or bead 126. As shown in this particular embodiment, the bead 126 is circumferential and extends completely around the rim of the housing 28". The wall 28" has extending between the bead 126 and a free end 128 that defines the open mouth 32" an attachment portion 130. The attachment portion 130 allows the thread plate 74 to be secured to the housing wall 28" by way of fusion bonding, such as a weld 12. Note that the rim 92 of the thread plate 74 engages the bead 126. In this embodiment, the tabs 1 10 engage the bead 126. In the embodiment shown, the rim 92 and the tabs 110 engage opposite sides 133, 134 of the bead 126.

In reference now to FIGS. 6-12, and starting with FIG. 7, another embodiment of a filter arrangement is shown generally at 140. In FIG. 7, a filter assembly is shown generally at 142 and includes a filter head 144 with the filter assembly 142 removably secured thereto. The filter head 144 includes a body or block 146 defining fluid flow channels 148, 150. In the embodiment shown, each of the flow channels 148, 150 terminates at a flow port 152, 154. In a forward-flow arrangement, the flow channel 148 corresponds to an inlet or dirty fluid flow channel 149 with the port 152 corresponding to an inlet flow port 153 In a forward-flow system, the flow channel 150 corresponds to an outlet or clean flow channel 151 with the port 154 corresponding to an outlet flow port 155. A seal member 159 is shown between housing end 176 (FIG. 8) and the filter head 144.

When the filter head 144 is operably connected to the filter arrangement 140, the flow channel 148 terminates at port 156 which is in fluid flow communication with volume 158. Volume 158 is defined further below. The flow channel 150 terminates at port 160, and when the filter head 144 is in operable connection with the filter arrangement 140, the port 160 is in fluid flow communication with the open filter interior 162.

As with the embodiment of FIG. 1, the filter arrangement 140 shown in FIG. 7 includes a housing 166 and a filter cartridge 168 oriented therewithin. The housing 166 is embodied in the form of a can 170 having a surrounding wall 172 and defining a closed end 174 and an open mouth or end 176 (FIG. 8).

Figure 8:
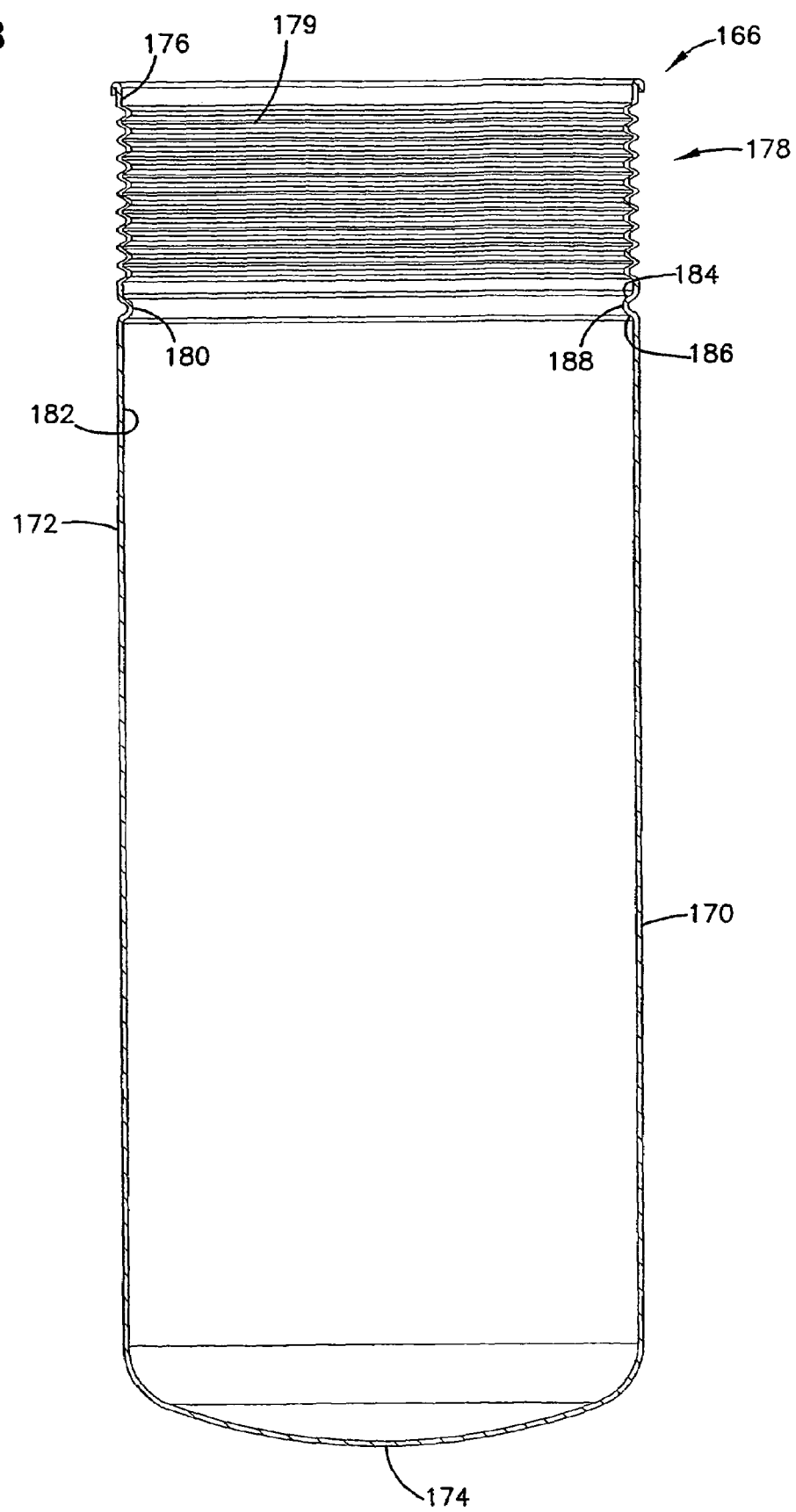
FIG. 8 is a cross-sectional view of the filter housing shown in FIG. 7.

In reference to FIG. 8, the housing 166 includes a threaded region 178 adjacent to the open mouth 176. The threaded region 178, in the particular embodiment shown, is shown to be manufactured as a part of the can 170. The threaded region 178 can include, for example, rolled threads 179 or other types of formed threads. The threaded region 178 can also be made through a process of machining internally into the can 170 the threads. Alternatively, the housing 166 may include mechanism 70 of the type shown in FIG. 1, embodied in the form of thread plate 74 mechanically secured to the can 170. It should be understood that the housing 22 in FIG. 1 can also be the type of housing shown in FIG. 8 with a threaded region 178 as shown.

The particular embodiment of the housing 166 illustrated in FIG. 8 includes an inwardly extending projection or bead 180. The bead 180 is analogous to the bead 126 illustrated in FIG. 5. The bead 180 is circumferential and extends completely along the internal radial surface 182 of the housing wall 172. As can be seen in FIG. 8, the bead 180 is located in a position between the closed end 174 and the threaded section or region 178. The threaded region 178 is located between the bead 180 and the open mouth 176. The bead 180 is depicted as being generally curved shape having opposite sides 184, 186 joined together at a curved apex 188. As will be explained further below, the bead 180 interacts with structure to space the filter cartridge 168 from the housing wall 172 to define a fluid flow path between the filter cartridge 168 and the wall 172.

Figure 9:
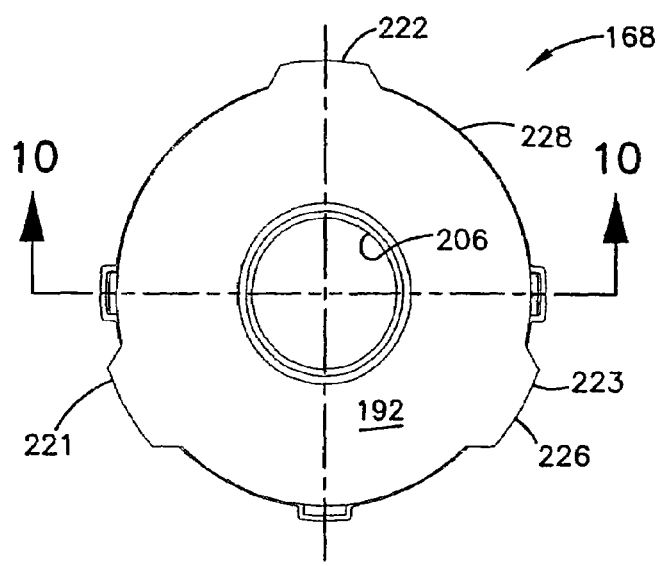
FIG. 9 is an end view of the filter cartridge utilized in the filter arrangement of FIGS. 6 and 7.
Figure 10:
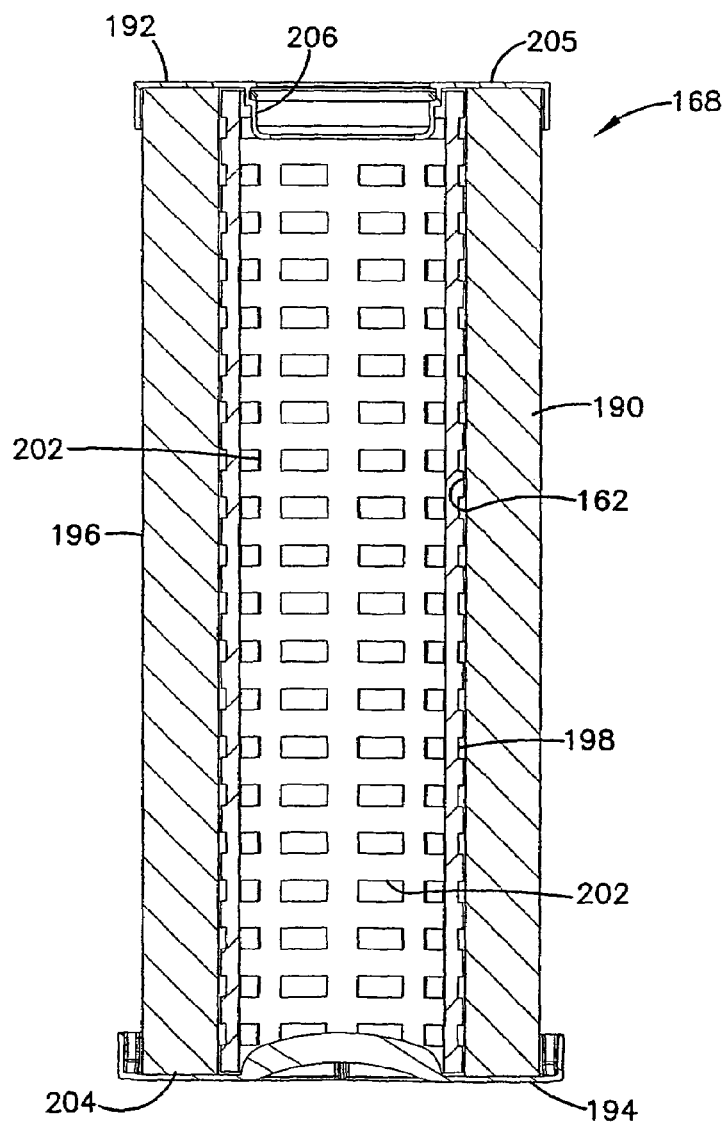
FIG. 10 is a cross-sectional view of the filter cartridge depicted in FIG. 9, the cross-section being taken along the line 10-10 of FIG. 9.

In reference now to FIGS. 9 and 10, one embodiment of the filter cartridge 168 is illustrated. The filter cartridge 168 is similar to the filter cartridge 24, except for the end cover 54 of FIG. 1. The filter cartridge 168 includes a region of media 190 extending between a first end cap or end cover 192 and a second end cap or end cover 194. The filter media 190 can be a variety of different media types. In the example shown, the media 190 is pleated media 196. The pleated media is formed in a tubular configuration such that it defines and surrounds open filter interior 162. Also extending between the end covers 192 and 194 is an internal support tube or liner 198. The inner liner 198 is circumscribed by the pleated media 196. The inner liner 198 is constructed of a material such as a rigid plastic with a plurality of holes 202 formed to allow for the flow of fluid therethrough. As can be seen in FIG. 10, the second end cap 194 is a closed end cap, which defines no openings or holes. The second cap 194 covers the end 204 of the media 190 and closes the open filter interior 162 at the end 204. The end cover 192 defines an aperture or opening 206 to allow fluid flow communication with the open filter interior 162.

In reference again to FIG. 7, the filter arrangement 140 includes a projection arrangement 210 analogous to the projection arrangement 100 described above. The projection arrangement 210 is constructed and arranged to space the filter cartridge 168 from the housing 166 to define a fluid flow path between the filter cartridge 168 and the housing wall 172. This can be seen by a review of FIG. 7. Fluid to be cleaned is directed through the inlet port 153 into the filter head 144. The fluid flows through the dirty flow channel 149 and out through the port 156. From there, the fluid flows into the volume 158 between the cartridge 168 and the housing wall 172. The projection arrangement 210 spaces the cartridge 168 from the housing 166 to allow a fluid path for the fluid to flow in order to get to the volume 158. The fluid then flows through the filter media 190, which removes at least some of the contaminants therein. The clean fluid flows through the inner liner 198 and into the open filter interior 162. From there, the clean fluid flows through the aperture 206 (FIG. 10) and through the port 160. From there, it flows through the clean flow channel 151 and exits the filter head 142 through the outlet port 155.

As explained above with respect to the embodiment of FIG. 1, the projection arrangement 210 can be embodied in a variety of configurations. In the particular embodiment shown in FIGS. 6-12, the projection arrangement 210 is part of the end cover 192. In reference now to FIG. 12, the end cover 192 includes a base 212 and a side wall 214. The base 212 is generally orthogonal to the end 205 (FIG. 10) of the filter media 190. The side wall 214,is generally parallel to the direction of the filter media 190. The side wall 214, in the embodiment shown in FIG. 12, is also generally orthogonal to the base 212. The side wall 214, in the embodiment shown, defines a media containing portion 216 that forms a continuous wall 218 around the filter media 190. As can be seen in FIG. 12, the media-containing portion 216 extends from the base 212.

Still in reference to FIG. 12, the projection arrangement 210 includes at least one, and in the embodiment shown, a plurality of projections 220. In the embodiment shown in FIGS. 11 and 12, there are three projections 221, 222, and 223. In FIG. 11, it can be seen how the projections 221, 222, and 223 are equally spaced from each other in the example embodiment. In other embodiments, the spacing can vary. In the embodiment shown, each of the projections 221, 222, and 223 extends radially from the end cover 192. In particular, in FIG. 12, it can be seen how the projection 221 extends radially from the base 212 of the end cap 192. Each of the projections 221, 222, 223 is, in the embodiment shown, generally orthogonal relative to the media containing portion 216.

In the embodiment shown in FIGS. 11 and 12, each of the projections 221, 222, 223 is in the form of tabs 226 extending from the end cap 192. The tabs 226 extend from or project from the outer peripheral rim 228 of the base 212.

The tabs 226 are formed of a material that provide a desired amount of flexibility and elasticity. As such, the tabs 226 can elastically deform under hand force to allow for the operable installation of the filter cartridge 168 into the housing 166. This is described further below.

In reference again to FIG. 7, interaction between the filter cartridge 168 and the filter housing 166 can be seen through the engagement of the tabs 226 with the bead 180. In particular, the tabs 226 are engaged against side 186 of bead 180 to trap and hold the filter cartridge 168 into the housing 166. A fluid flow path 230 is formed between the end cover 192 and the filter housing 166 because of the space or volume between the outer periphery 228 of the end cover 192 and the wall 172. The tabs 226 engage the internal radial surface 182 of the can to create the flow path 230. The outer axial surface 232 (FIG. 12) of the tabs 226 engages the side 186 (FIG. 8) of the can 166 to hold the cartridge 168 into the housing 166. Thus, the cartridge 168 is trapped between the bead 180 and the closed end 174 in the housing 166.

To construct the filter arrangement 140, the housing 166 is provided. The filter cartridge 168 is provided and inserted through the open end 176. The second axial surface 234 (FIG. 12) that is opposite from the outer axial surface 232 engages the side 184 of the bead 188. Force is applied to the filter cartridge 168 to press the cartridge 168 past the bead 188 and further into the housing 166. As this force is applied, the tabs 226 elastically deform and snap over the bead 180. The final resting position has the tabs 226 engaged against the bead 180; specifically, the outer axial surface 232 is engaging the side 186 of the bead 180. This creates a fluid flow path 230 between the outer peripheral rim 228 and the filter housing 166. The filter arrangement 140 is then assembled onto the filter head 144 to form filter assembly 142. This is done by spinning the filter arrangement 140 relative to the filter head 144 through the mating of the threaded region 178 on the housing 166 with threads 236 (FIG. 7) on the filter head 144.

The tabs 226 can be constructed from a variety of materials including plastic, glass filled nylon, metal, composites, or an independent spring.

Figure 13:
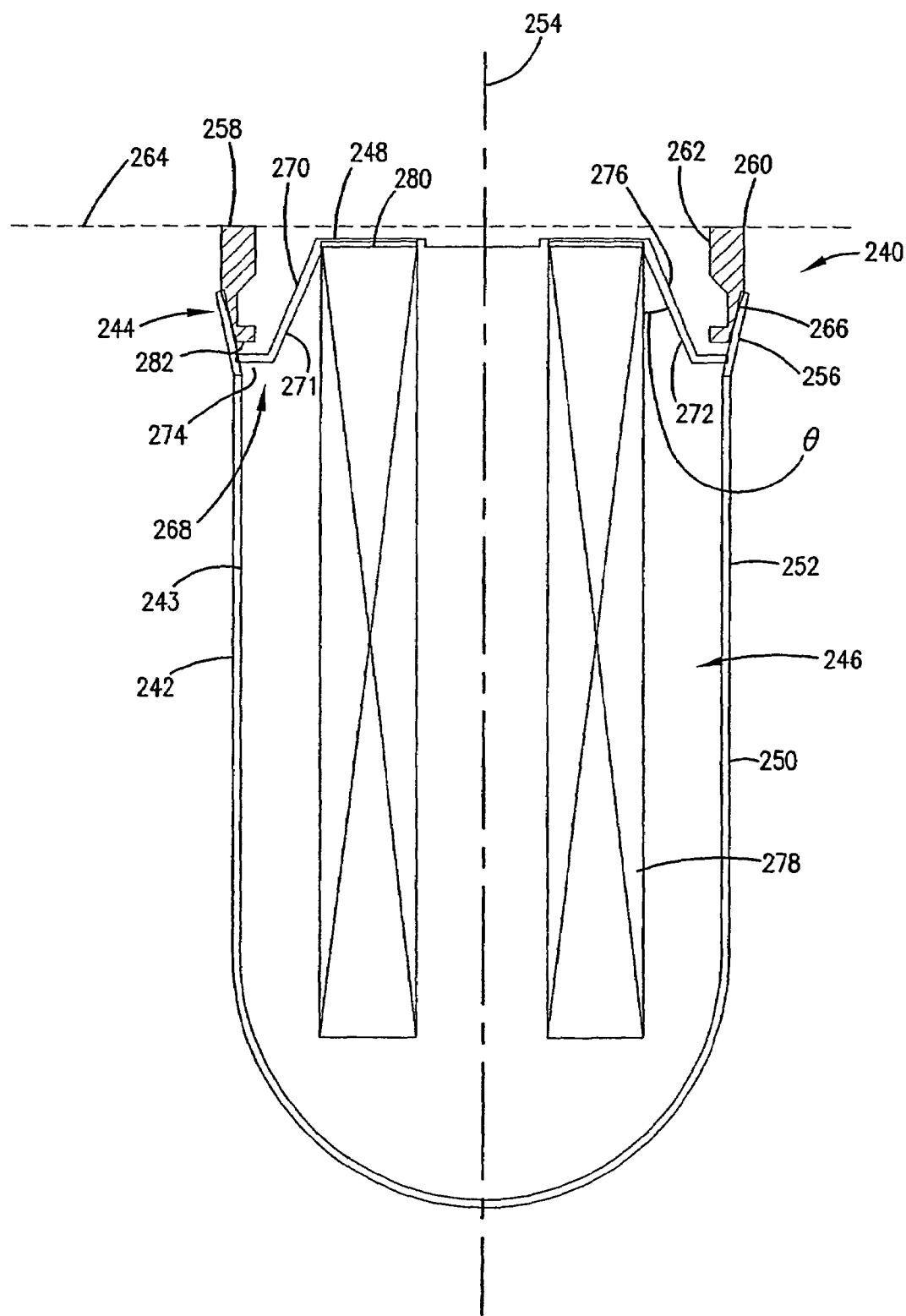
FIG. 13 is a schematic, cross-sectional view depicting another embodiment of a filter arrangement constructed according to principles of this disclosure.

Attention is next directed to FIG. 13, which shows an alternate embodiment for a filter arrangement generally at 240. The filter arrangement 240 includes housing 242 having a modified mouth 244. Positioned within the housing 242 is a filter cartridge 246. The cartridge 246 is analogous to the cartridges 24, 168, with the exception of the end cover 248. This is explained further below.

The modified mouth 244 of FIG. 13 and FIG. 15 is formed to have a cross-sectional opening that is greater than the cross-section of the main body 250 of the housing 242. As such, a wall 252 of the housing 242 angles radially outwardly (that is, away from a central longitudinal axis 254) at wall section 256 of the wall 252. In FIG. 16, the mouth (not shown) has a cross-sectional opening that is smaller than the cross-section of the main body 250. In FIG. 16, wall 252' angles radially inwardly at wall section 256' of wall 252'.

The housing 242 includes structure 258 for connecting with a filter head. In the embodiment shown, the structure 258 is schematically depicted as a thread plate 260 having threads 262 for engaging the filter head. The dashed line 264 illustrates, schematically, the position of the bottom base of the filter head.

The thread plate 260 can be secured to the can 243 in a variety of manners, and in the particular embodiment illustrated, it is done through metal fusion bonding such as a weld 266.

In this embodiment, there is again a projection arrangement 268 to space the filter cartridge 246 from the housing 242 and define a fluid flow path between the filter cartridge 246 and the housing 242. In this embodiment, the projection arrangement 268 includes a plurality of projections 270 in extension from the end cover 248. In the embodiment shown, the projections 270 are in the form of tabs 271, 272 extending from the end cover 248. While two tabs 271, 272 are shown in this schematic, cross-section, there may be three or more tabs extending from the end cover 248. In this embodiment, as with all other embodiments described, the projections 270 may either be a permanent, integral connection to the end cover 248; or, alternatively, the projections 270 are not permanently secured to the end cover 248—rather, they are press fit over the end cover 248. Alternatively, the projections 270 are secured (permanently or removably) to the housing 242.

The projections 270 include both radial extensions 274 and angled extensions 276. In particular, the angled extensions 276 are depicted as extending at an angle θ measured relative to the outer surface of the filter media 278. The angle θ is depicted as being non-orthogonal and not 180°. In the embodiment illustrated, the angle θ is shown to be an acute angle (less than 90°). In particular, the angle θ shown is between 10°-60°. Extending from the angled extension 176 is the radial extension 274. The radial extension 274 is illustrated, in this embodiment, as being generally parallel to a base 280 of the end cover 248.

The thread plate 260 includes a rim 282 located adjacent to the weld joint 266. When assembling the filter arrangement 240, the filter cartridge 246 is inserted into the housing 242. The projections 270 elastically deform (or bend) and snap over the rim 282 of the thread plate 260. Once over the rim 282, the projections 270 engage the housing 242 at either the wall 252, the thread plate rim 282, or both. The rim 282 helps to keep the filter cartridge 246 in place within the housing 242 and prevent it from falling out.

The arrangement of FIG. 13 allows for an extended length of filter media 278. This provides a longer lifetime to the cartridge 246 than in embodiments having a shorter length of media and less overall media.

Figure 14:
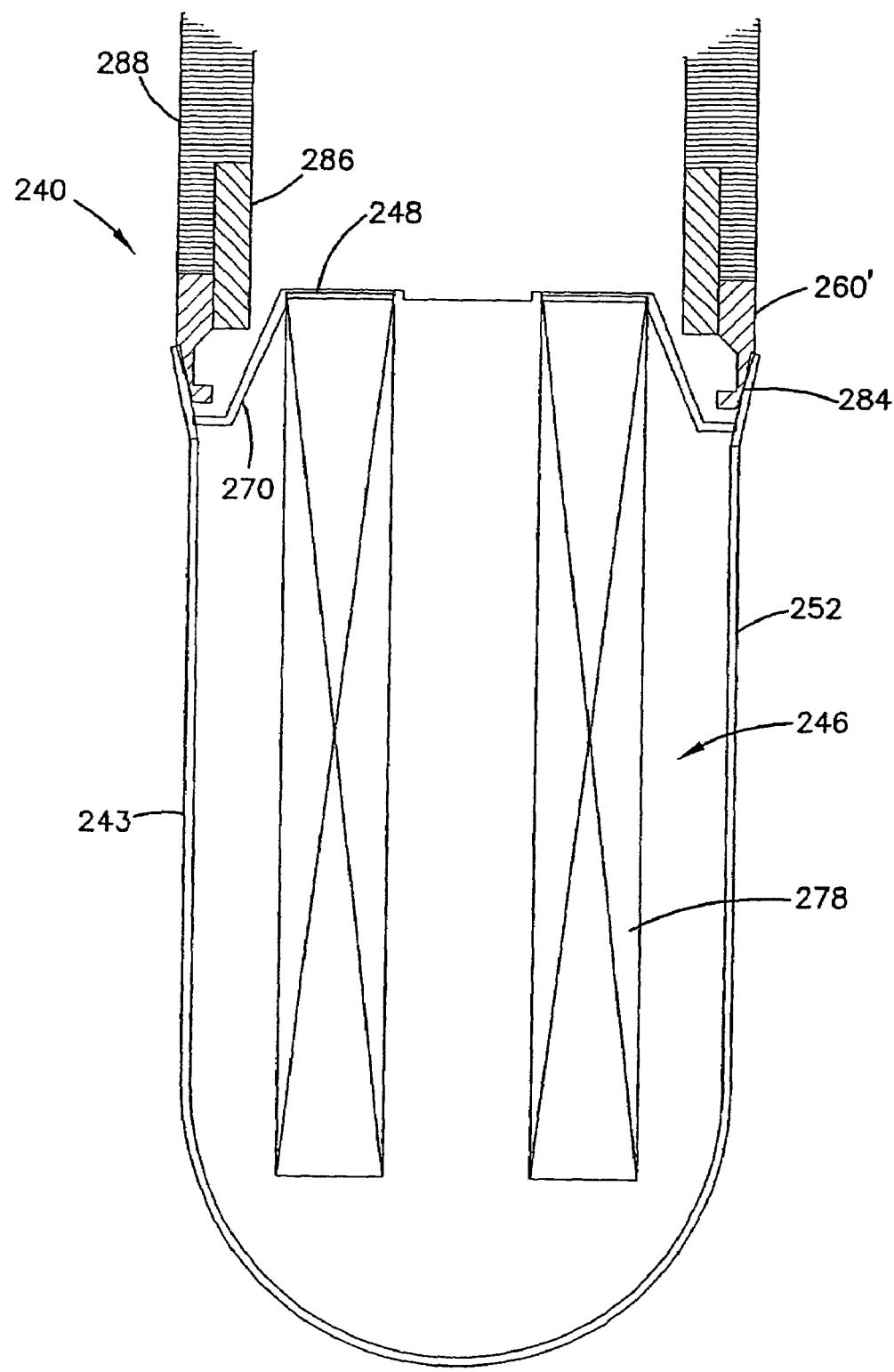
FIG. 14 is a schematic, cross-sectional view depicting another embodiment of a filter arrangement constructed according to principles of this disclosure.

FIG. 14 illustrates a variation in the thread plate 260 for the filter arrangement 240. In FIG. 14, the thread plate 260' is again welded at weld seam 284 to the wall 252. The thread plate 260', in this embodiment, is metal such as steel. A threaded steel boss 286 is bonded to an aluminum head 288. This type of arrangement will allow for an increased flow area into the can 243 over arrangements that would include solid aluminum at the thread plate 260'.

FIGS. 15 and 16 show two alternate embodiments of the weld point between the thread plate 293 and the can. FIG. 15 shows an externally welded can having a weld seam 290, while FIG. 16 shows an internally welded can having a weld seam 292. The thread plate 293 includes an axially disposed groove 295 for holding an O-ring gasket 294. The gasket 294 forms a seal with the filter head 144 when mounted thereto.

Figure 17:
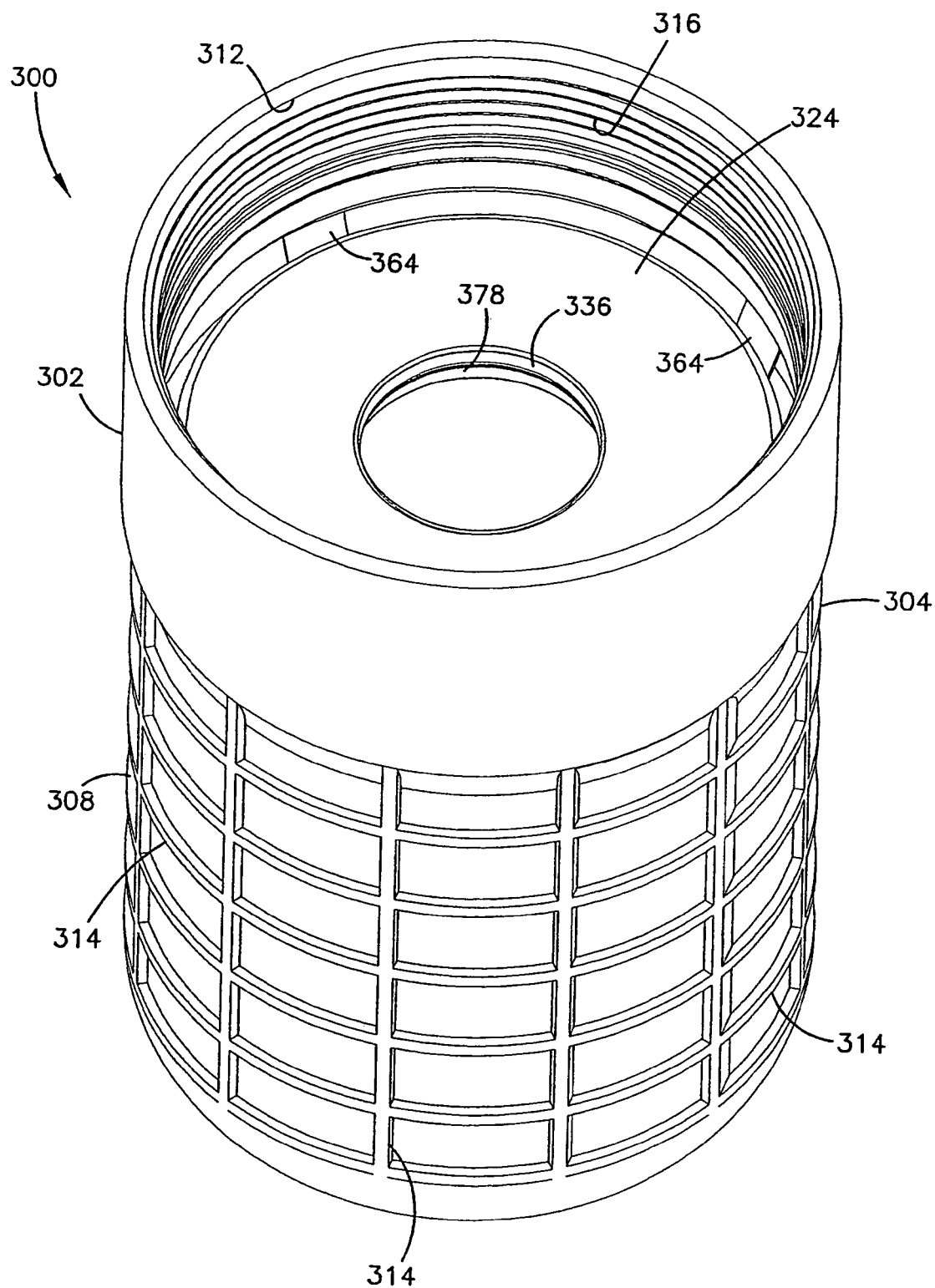
FIG. 17 is a perspective view depicting another embodiment of a filter arrangement constructed according to principles of this disclosure.
Figure 18:
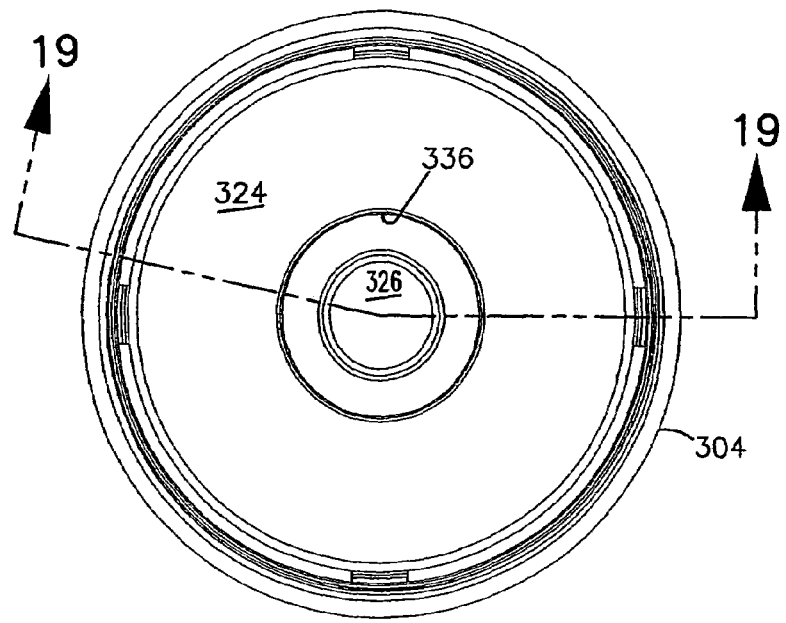
FIG. 18 is a top plan view of the embodiment depicted in FIG. 17.

In reference now to FIGS. 17-19, 21, and 22, another embodiment of a filter arrangement is shown generally at 300. In FIG. 17, a filter assembly 302 is illustrated in perspective view. The filter assembly 302 is removably mountable to a filter head, such as the filter head 144 shown in FIG. 7. The filter assembly 302 includes a housing 304 and a filter cartridge 306 (FIG. 19) oriented therewithin. The housing 304 has a surrounding wall 308 and includes a closed end 310 and an open mouth or end 312. The housing 304 in the embodiment of FIGS. 17-19 can be constructed of metal, but in the illustrated embodiment, it is constructed with a molded plastic. The outer wall 308 can be seen to have reinforcing ribs 314 to help strengthen the housing 304. In the embodiment shown in FIGS. 17 and 19, the housing 304 includes a threaded region 316 adjacent to the open mouth 312. The threaded region 316 is shown as being manufactured as part of the housing 304. As described above, the threaded region can be included in a variety of ways, including a separate thread plate secured to the housing 304.

Figure 19:
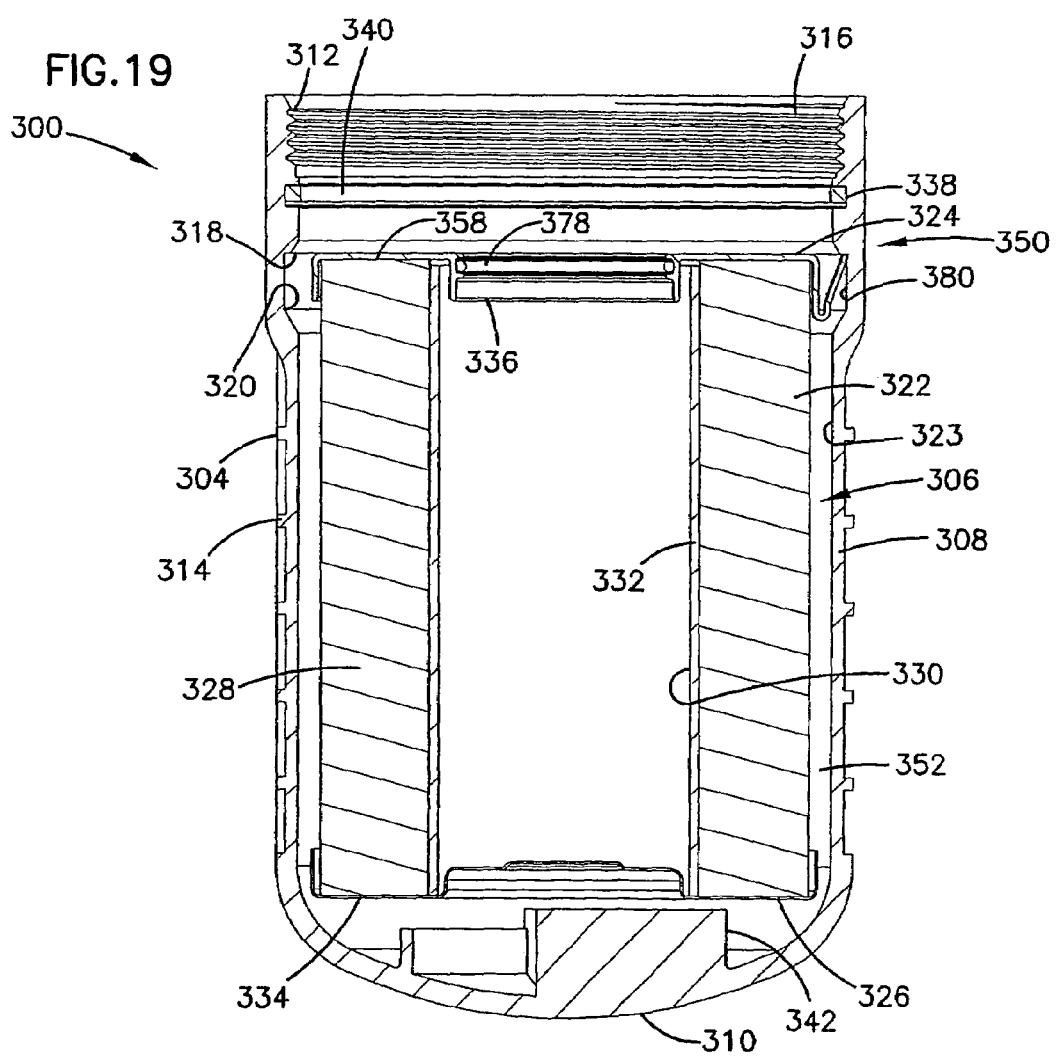
FIG. 19 is a schematic, cross-sectional view of the embodiment depicted in FIGS. 17 and 18, the cross-section being taken along the line 19-19 of FIG. 18.

The housing 304 illustrated in FIG. 19 includes an undercut or inwardly extending projection or ledge 318. The ledge 318 is analogous to the bead 180 and bead 126. The ledge 318 is circumferential and extends completely along the internal radial surface 320 of the housing wall 308. The ledge 318 is located in a position between the closed end 310 and the threaded region 316. A portion 323 of the housing wall 308 adjacent to the majority of the filter media 322 forms an internal diameter about equal to the internal diameter of the housing wall between the threaded section 316 and the ledge 318. Between the ledge 318 and the portion 323 is an area of increased internal diameter forming a relief 380. As will be explained further below, the ledge 318 interacts with structure to space the filter cartridge 306 from the housing wall 308 to define a fluid flow path between the filter cartridge 306 and the wall 308.

In reference now to FIG. 19, one embodiment of the filter cartridge 306 is illustrated in cross-section. The filter cartridge 306 is similar to the filter cartridge 24 except for the use of certain materials. As with the embodiment of FIG. 1, the filter cartridge 306 includes a region of media 322 extending between a first end cap 324 and a second end cap 326. While the filter media 322 can be a variety of different media types, in the illustrated example, the media 322 is pleated media 328. The media 322 is formed in a tubular configuration such that it defines and surrounds an open filter interior 330. Also extending between the first end cap 324 and second end cap 326 is an internal support tube or liner 332. The inner liner 332 functions to support the media 322 and is constructed of a material such as a rigid plastic or metal defining holes to allow for the flow of fluid therethrough. As can seen in FIG. 19, the second end cap 326 is a closed end cap, which defines no openings or holes. The second end cap 326 covers the end 334 of the media 322 and closes the open filter interior 330 at the end 334. The first end cap 324 defines an aperture or opening 336 to allow fluid flow communication with the open filter interior 330.

The housing 304 defines a groove 338 between the ledge 318 and the threaded region 316. The groove 338 holds an O-ring 340 for forming a seal with a filter head. While the first and second end caps 324, 326 can be constructed of many different materials, including metal, in preferred embodiments, the first end 324 is constructed of plastic and the second end cap 326 is constructed of metal. Note that the housing 304 includes support structure 342 molded within its closed end 310. The support structure 342 helps to give overall strength to the housing 304, and in addition, provides axial support and positioning of the filter cartridge 306 within the housing 304. This support structure 342 eliminates the use of a spring, such as spring 67 in the embodiment of FIG. 1.

Still in reference to FIG. 19, the filter arrangement 300 includes a projection arrangement 350 analogous to the projection arrangement 210 and projection arrangement 100, described above. The projection arrangement 350 is constructed and arranged to space the filter cartridge 306 from the housing 304 to define a fluid flow path between the filter cartridge 306 and the housing wall 308. This can be seen by a review of FIG. 19. Fluid to be cleaned is directed into the housing 304 and into the volume 352 between the cartridge 306 and the housing wall 308. The projection arrangement 350 spaces the cartridge 306 from the housing 304 to allow a fluid path for the fluid to flow in order to get to the volume 352. The fluid then flow through the filter media 322, which removes at least some of the contaminants therein. The cleaned fluid flows through the inner liner 332 and into the open filter interior 330. From there, the clean fluid flows through the aperture 336 and then out through the filter head.

As explained above, with respect to the other embodiments, the projection arrangement 350 can be embodied in a variety of configurations. In the embodiment shown in FIGS. 17-19 and 21 and 22, the projection arrangement 350 is an integral part of the first end cap 324. In reference now to FIG. 21, the end cap 324 includes a base 354 and a side wall 356. The base 354 is generally orthogonal to the end 358 of the filter media 322. The side wall 356 is generally parallel to the direction of the filter media 322. The side wall 356 is also generally orthogonal to the base 354. The side wall 356, in the embodiment shown, defines a media containing portion 360 that forms a continuous wall 356 around the filter media 322.

Still in reference to FIGS. 21 and 22, the projection arrangement 350 includes at least one, and in the embodiment shown, a plurality of projections 362. In the particular embodiment shown, there are four projections, each spaced equally from each other by about 90°. As with the embodiment of FIG. 2, each of the projections 362 is in the form of tangs or tabs 364 extending from the first end cap 324. The tabs 364 include a base section 366 joined at a bight 368 to the wall 360. The base section 366 defines a free end 372. It can be appreciated that each of the tabs 364 is cantilevered from the end cap 324. In the illustrated example, the tabs 364 are configured to be in extension from the media-containing portion 360 of the first end cap 324. Of course, there can be other embodiments. The first end cap 324 also can be seen in FIG. 21 as defining a groove 376. The groove 376 holds an O-ring seal member 378 (FIG. 19). The O-ring seal member 378 forms a seal with a filter head.

To construct the filter arrangement 300, the housing 304 is provided. The filter cartridge 306 is inserted through the open mouth 312. The filter cartridge 306 engages the support structure 342 at the closed end 310. The tabs 324 are biased radially inwardly by engagement against the internal surface of the housing 304, until reaching the undercut or ledge 318. The relief 380 that results from the undercut or ledge 318 allows the tabs to spring back to their normal position. When this happens, the free end 372 of the tabs 364 engage the ledge 318. This traps the filter cartridge 306 within the housing 308.

Figure 20:
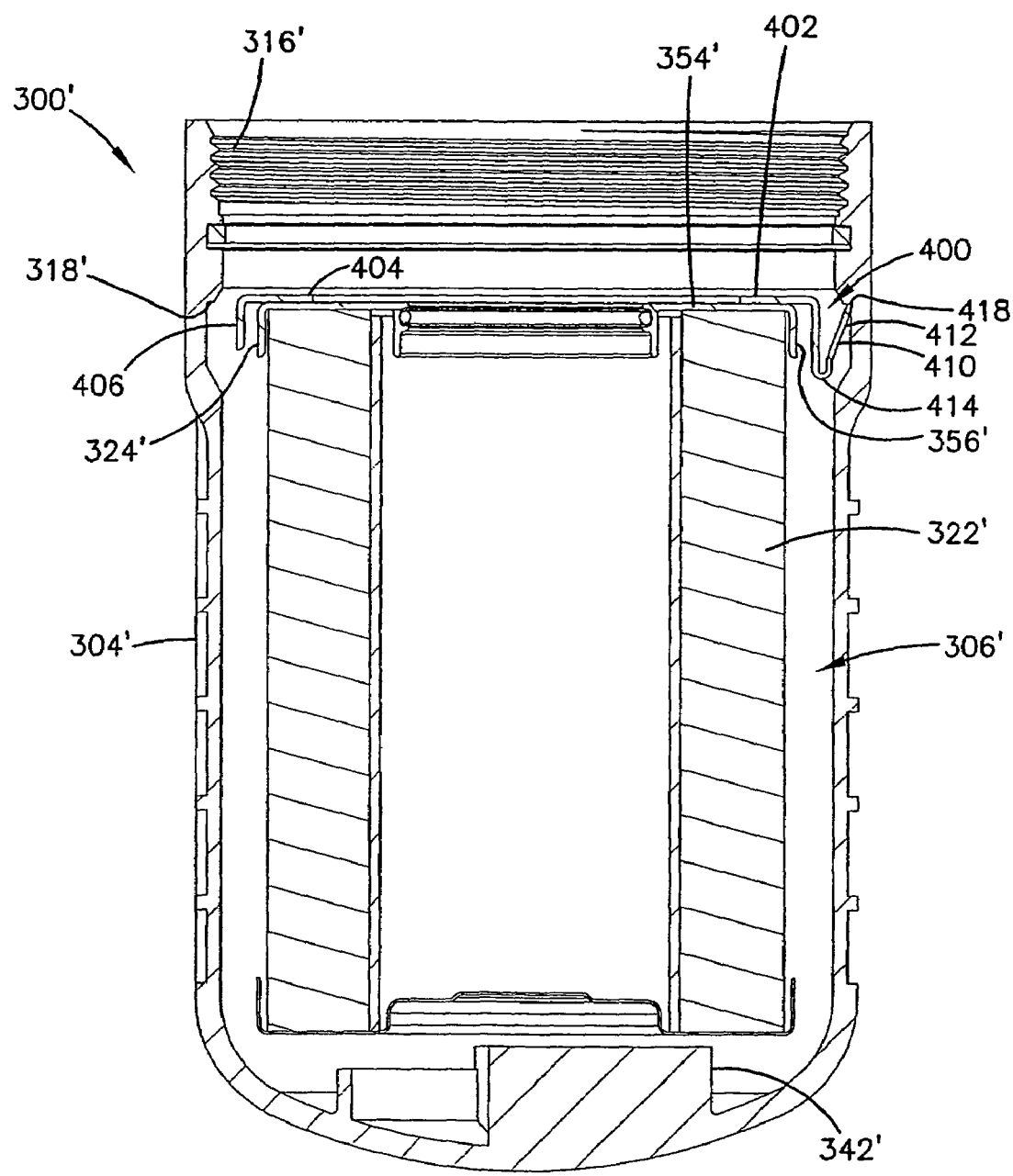
FIG. 20 is a schematic, cross-sectional view depicting another embodiment of a filter arrangement constructed according to principles of this disclosure.

An alternate embodiment is illustrated in FIG. 20. The embodiment of FIG. 20 is the same as the embodiment of FIG. 19 with the exception of the first end cap. The first end cap is shown in FIG. 20 as end cap 324'. The first end cap 324' in the FIG. 20 embodiment does not include an integral projection arrangement. It simply has a closed, continuous side wall 356' with no projections or tabs extending from it. The filter arrangement 300', however, does include a projection arrangement 400. In this embodiment, the projection arrangement 400 is part of a separate and independent plate 402. The plate 402, in the embodiment shown, is oriented on top of the first end cap 324', and below the threaded section 316'. The plate 402 has a base 404, that is oriented generally parallel to the base 354' of the first end cap 324 and a side wall 406 that is generally perpendicular to the base 404. The side wall 406, in the embodiment shown, generally circumscribes the side wall 356' of the end cap 324' and the media 322'. Integral with the plate 402 is a plurality of projections 410. While only a single projection 410 can be seen in the cross-section of FIG. 20, it should be understood that there will generally be more than one projection 410, such as four projections as illustrated in FIG. 22. The projections 410 are constructed analogously as the projections 362. In particular, each of the projections 410 includes a base section 412 joined by a bight section 414 to the side wall 406. Each base section 412 defines a free end 418.

In use, to assemble the filter arrangement 300', the filter cartridge 306' is inserted into the housing 304'. Next, the filter cartridge 306' is secured in place within the housing 304' by inserting the drop-in plate 402. The drop-in plate is oriented to rest on top of the first end cap 324'. The filter cartridge 306' is then trapped between the drop-in plate 402 and the support structure 342'. The projections 410 of the plate 402 deflect radially inwardly while being inserted in the housing 304' and then snapped back to their normal orientation and engage the ledge 318' of the housing 304'.

In use, to purify fluids using filters of the type described herein in FIGS. 1-22, the filter arrangements are provided and spun onto a filter head. The fluid to be clean flows through the filter head, into the housing, through the filter cartridge, out of the filter housing, back through the filter head, and then out of the filter head After a period of use, the filter media will become clogged or occluded. At this point, servicing of the filter is desired. To service the filter, the filter is removed by spinning it off of the head. That is, the threaded engagement between the filter arrangement and the filter head is unmated. In some uses, the entire filter arrangement will be disposed of and replaced with a new filter arrangement. For example, in the embodiments of FIGS. 1-5, the entire filter arrangement is discarded and replaced with a new filter arrangement. Also, in the embodiments of FIGS. 7-22, the entire filter arrangement may be disposed of and replaced with a new filter arrangement. It is contemplated that in certain arrangements, such as in the embodiments of FIGS. 7-16, the old filter cartridge can be removed from the housing by pulling it through the mouth. The tabs will either break off or flex over the internal housing projections to allow for the removal of the filter cartridge from the housing. In such instances, the old filter cartridge is discarded (or recycled) and replaced with a new filter cartridge. The new filter cartridge is inserted into the housing. If the tabs are connected to the cartridge, the tabs flex and snap over the housing bead or projection. If the tabs are separate from the cartridge, the projection arrangement is mounted in place in the housing until the tabs flex and snap over the housing bead or projection. The new filter arrangement can again be mounted in operable assembly onto the filter head.

In the embodiments described, the projections on the end cap can be made from a variety of materials including metal, plastic, and composites. The housings can be plated or finished with chrome or nickel plating or heat treated before the cartridge is inserted therein. This allows the housing to be treated for corrosion resistance. It should be appreciated that due to the convenient assembly, the housing can be manufactured independently and in a separate facility or separate location from the manufacturing of the filter cartridges. The final assembly of the cartridge within the housing can be done at yet a third location.

In some applications, the filter media used therein can be a resin bed. The resin bed can be used to fill up to the outer diameter of the housing.

The thread plate can be made from a variety of materials including stamping, machining from pipe, or formed from powdered metal.

What is claimed is:

1. A fluid filter arrangement comprising:
   (a) a housing having a wall defining a closed end, an open end, an interior volume, and an inwardly extending ledge;
      (i) the housing including a threaded region adjacent to the open end;
      (ii) the inwardly extending ledge being circumferential and extending completely along an internal surface of the housing wall;
         (A) the inwardly extending ledge being located between the closed end and the threaded region;
   (b) a filter cartridge oriented within said interior volume of said housing; said filter cartridge including a tubular construction of filter media defining an open filter interior;
      (i) said tubular construction of filter media having a first end;
      (ii) said filter cartridge includes an end cap secured to said first end of said tubular construction of filter media; said end cap defining an aperture in fluid communication with said open filter interior;
   (c) a projection arrangement constructed and arranged to space said filter cartridge from said housing wall to define a fluid flowpath between said filter cartridge and said housing wall;
      (i) the projection arrangement includes a base and a sidewall;
      (ii) said projection arrangement comprising at least one projection in extension from at least one of said base and said sidewall;
      (iii) the projection arrangement engaging the inwardly extending ledge to space said filter cartridge from said housing wall to define a fluid flowpath between said filter cartridge and said housing wall;
   (d) wherein a portion of the housing wall adjacent to the filter media defines an internal diameter about equal to an internal diameter of the housing wall between the threaded section and the internally extending ledge;
      (i) between the internally extending ledge and the portion is a region of the housing wall having an internal diameter greater than the internal diameter of the portion to form a relief;
         (A) the relief allowing the projection arrangement to spring back to a normal position.

2. A method of making a filter; the method comprising:
   (a) inserting a filter cartridge and a projection arrangement into an open end of a housing; and
   (b) engaging projections on the projection arrangement against a portion of the housing to secure the filter cartridge in the housing;
      (i) the portion of the housing including an inwardly extending circumferential ledge extending completely along an internal surface of the housing; and
      (ii) the engagement of the projection arrangement is against a side of the ledge directed to a closed end of the housing;
   (c) wherein the step of inserting the filter cartridge and projection arrangement into the housing includes snapping the projections over a radial protrusion in the housing.

3. A method according to claim 2 wherein:
   (a) the filter cartridge includes an end cap having the projections extending therefrom; and
   (b) said step of engaging includes engaging the projections from the end cap against the inwardly extending ledge of the housing.

4. A method according to claim 2 wherein:
   (a) said step of inserting includes inserting a filter cartridge and then inserting a separate plate into the open end of the housing;
      (i) the separate plate including the projecting arrangement.

5. A method according to claim 2 wherein:
   (a) said step of inserting includes snapping the projections over a radial protrusion in the housing; and
   (b) said step of engaging includes engaging the projections against the radial protrusion.

* * * * *